(12) United States Patent
Jiao et al.

(10) Patent No.: US 10,324,686 B2
(45) Date of Patent: Jun. 18, 2019

(54) ELECTRONIC DEVICE AND OPERATION METHOD THEREFOR

(71) Applicant: SAMSUNG ELECTRONICS CO., LTD., Suwon-si (KR)

(72) Inventors: Shaohui Jiao, Beijing (CN); Haitao Wang, Beijing (CN); Mingcai Zhou, Beijing (CN); Tao Hong, Beijing (CN); Weiming Li, Beijing (CN); Xiying Wang, Beijing (CN); Dong Kyung Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 15/119,595

(22) PCT Filed: Feb. 13, 2015

(86) PCT No.: PCT/KR2015/001466
§ 371 (c)(1),
(2) Date: Aug. 17, 2016

(87) PCT Pub. No.: WO2015/122712
PCT Pub. Date: Aug. 20, 2015

(65) Prior Publication Data
US 2017/0054971 A1    Feb. 23, 2017

(30) Foreign Application Priority Data

Feb. 17, 2014  (CN) .......................... 2014 1 0053867
Aug. 26, 2014  (KR) ........................ 10-2014-0111369

(51) Int. Cl.
*G06F 3/16* (2006.01)
*H04N 13/305* (2018.01)
(Continued)

(52) U.S. Cl.
CPC ............ *G06F 3/167* (2013.01); *G06F 1/1637* (2013.01); *G06T 15/20* (2013.01); *H04N 13/305* (2018.05);
(Continued)

(58) Field of Classification Search
CPC ........... H04N 13/0404; H04N 13/0406; H04N 13/0454; G06F 3/167; G06F 3/0362
See application file for complete search history.

(56) References Cited

U.S. PATENT DOCUMENTS

| | | |
|---|---|---|
| 8,368,745 B2 * | 2/2013 | Nam .................. G02B 27/2214 348/51 |
| 2007/0153380 A1 | 7/2007 | Shestak |

(Continued)

FOREIGN PATENT DOCUMENTS

| | | |
|---|---|---|
| JP | 2006-514340 A | 4/2006 |
| JP | 2007-319237 A | 12/2007 |

(Continued)

OTHER PUBLICATIONS

Search Report dated May 1, 2015 issued by the International Searching Authority in counterpart International Patent Application No. PCT/KR2015/001466 (PCT/ISA/210).

(Continued)

*Primary Examiner* — Mishawn N. Hunter
(74) *Attorney, Agent, or Firm* — Sughrue Mion, PLLC

(57) ABSTRACT

An electronic device and an operation method therefor are provided. The electronic device may include: a display panel; an optical element; and a control unit which senses a location of the optical element, generates a 3D image through via display panel and the optical element in a state in which the display panel and the optical element overlap each other, and generates a 2D image via the display panel (Continued)

in a state in which the optical element is detached or separated from the display panel.

15 Claims, 12 Drawing Sheets

(51) Int. Cl.
*G06T 15/20* (2011.01)
*G06F 1/16* (2006.01)
*H04N 13/359* (2018.01)
*H04N 13/307* (2018.01)

(52) U.S. Cl.
CPC ......... *H04N 13/307* (2018.05); *H04N 13/359* (2018.05); *G06T 2215/16* (2013.01); *H04N 2213/001* (2013.01)

(56) References Cited

U.S. PATENT DOCUMENTS

| | | | |
|---|---|---|---|
| 2008/0316302 | A1 | 12/2008 | Vos et al. |
| 2011/0013879 | A1* | 1/2011 | Osawa ............... H04N 21/4126 386/228 |
| 2011/0157169 | A1* | 6/2011 | Bennett .................... G06F 3/14 345/419 |
| 2011/0157329 | A1* | 6/2011 | Huang ................ H04N 13/359 348/54 |
| 2012/0249545 | A1 | 10/2012 | Kim |
| 2013/0196709 | A1* | 8/2013 | Nho ....................... G06F 1/324 455/550.1 |
| 2014/0015743 | A1* | 1/2014 | Seo ....................... G06F 1/1694 345/156 |
| 2014/0111713 | A1* | 4/2014 | Kizu ..................... G02B 27/26 349/15 |

FOREIGN PATENT DOCUMENTS

| | | |
|---|---|---|
| KR | 10-2004-0097972 A | 11/2004 |
| KR | 10-2006-0060409 A | 6/2006 |
| KR | 10-2013-0045109 A | 5/2013 |
| KR | 10-1307774 B1 | 9/2013 |

OTHER PUBLICATIONS

Written Opinion dated May 1, 2015 issued by the International Searching Authority in counterpart International Patent Application No. PCT/KR2015/001466 (PCT/ISA/237).

* cited by examiner

351A

351B

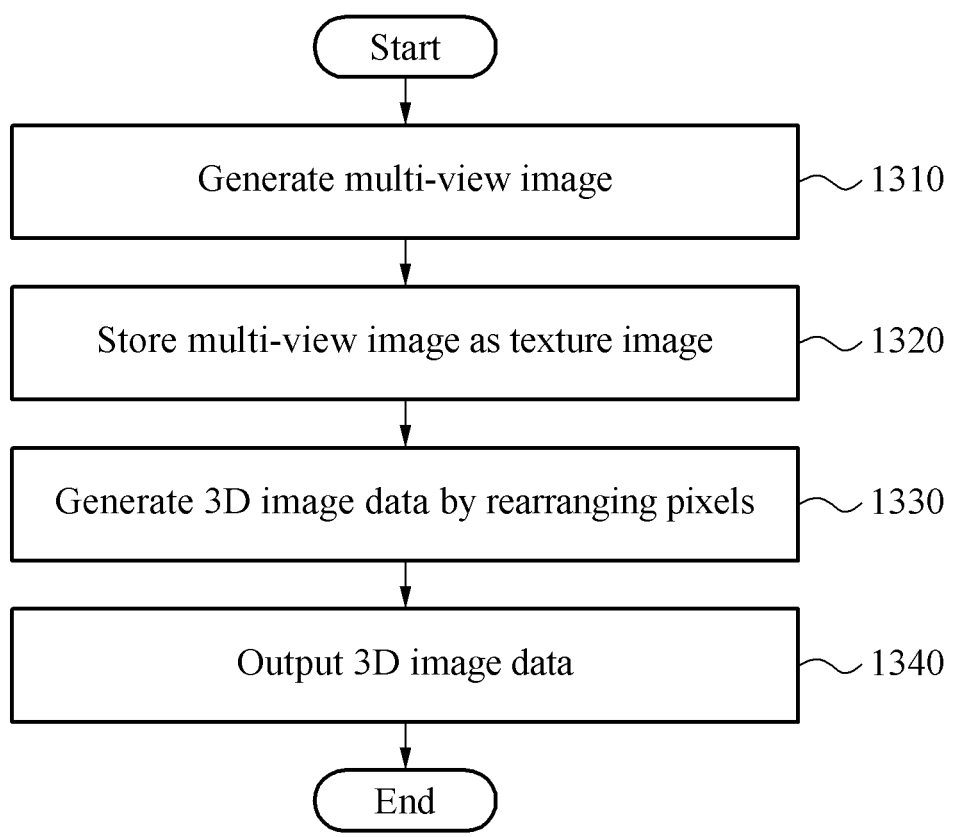

ELECTRONIC DEVICE AND OPERATION METHOD THEREFOR

The present application is a National Stage Entry of International Application PCT/KR2015/001466, filed Feb. 13, 2015, which claims the benefit of Chinese Patent Application No. 201410053867.3, filed Feb. 17, 2014, and Korean Patent Application No. 10-2014-0111369, filed Aug. 26, 2014.

TECHNICAL FIELD

Apparatuses and methods consistent with exemplary embodiments relate to an electronic device and an operation method thereof.

BACKGROUND ART

Current mobile devices include the functions of smartphones, as well as various other functions. For example, a mobile device may have an autostereoscopic display function. An autostereoscopic display function is technology that enables a user of the mobile device to view a natural three-dimensional (3D) image without a need for special glasses.

Generally speaking, a mobile device may generate a 3D image by refracting light, output by a display panel, in different directions in space using a parallax barrier and/or a lens array.

SUMMARY

One or more exemplary embodiments may provide an electronic device to switch between a two-dimensional (2D) display operation and a three-dimensional (3D) display operation and to display a 2D image and a 3D image.

One or more exemplary embodiments may also provide technology for rapidly generating 3D image data by generating a multi-view image using a parallel rendering technique.

According to an aspect of an exemplary embodiment, there is provided an electronic device including a display panel, an optical element, and a controller configured to sense a position of the optical element with respect to the display panel, generate a three-dimensional (3D) image through the display panel and the optical element in a state in which the display panel overlaps the optical element, and generate a two-dimensional (2D) image through the display panel in a state in which the optical element is detached from the display panel.

The controller may be configured to measure a displacement of the optical element and generate the 3D image based on the measured displacement.

The controller may be configured to calculate a rendering parameter for generating the 3D image based on the measured displacement.

The measured displacement may include a rotation parameter and a translation parameter.

The controller may include a mode selector configured to generate a mode selection signal (SEL) for a display operation of the display panel and the optical element based on a position of the display panel and a position of the optical element, a displacement sensor configured to measure a displacement of the optical element in response to the SEL, a parameter generator configured to calculate a rendering parameter for rendering based on the measured displacement, and a graphic processing unit (GPU) configured to generate the 3D image using the rendering parameter.

The controller may further include an aligning unit configured to acquire information on a state of alignment between the optical element and the display panel, and the GPU is configured to generate the 3D image using the rendering parameter based on the information on the state of alignment.

The mode selector may include a position sensor configured to sense the position of the display panel and the position of the optical element and generate a sensing signal, and a mode controller configured to determine the position of the display panel and the position of the optical element in response to the sensing signal and generate the SEL based on a result of the determination.

The mode selector may further include a switching button unit configured to generate a switching signal in response to a user input, and the mode controller may be configured to generate the SEL in response to the switching signal.

The mode selector may further include a voice command processing unit configured to recognize a voice command of a user and generate the switching signal by processing the voice command, and the mode controller may be configured to generate the SEL in response to the switching signal.

The optical element may be at least one of a microlens array, a microprism array, and a lenticular lens array.

The optical element may be disposed in a cover of the electronic device and the display panel is disposed in a main body of the electronic device.

The electronic device may be a portable device.

The cover may be at least one of a flip close type, a flip over type, a slide type, and a rotation type.

According to an aspect of another exemplary embodiment, there is provided an operation method of an electronic device, the method including sensing a position relationship between an optical element and a display panel, and generating a three-dimensional (3D) image through the display panel and the optical element in a state in which the display panel overlaps the optical element, and generating a two-dimensional (2D) image through the display panel in a state in which the optical element is detached from the display panel.

The generating of the 3D image may include measuring a displacement of the optical element and generating the 3D image based on the measured displacement.

The generating of the 3D image may further include calculating a rendering parameter for generating the 3D image based on the measured displacement.

The measured displacement may include a rotation parameter and a translation parameter.

The optical element may be at least one of a microlens array, a microprism array, and a lenticular lens array.

The optical element may be disposed in a cover of the electronic device and the display panel is disposed in a main body of the electronic device.

The cover may be at least one of a flip close type, a flip over type, a slide type, and a rotation type.

BRIEF DESCRIPTION OF DRAWINGS

The above and other exemplary aspects and advantages will be more apparent from the following detailed description of exemplary embodiments in which:

FIG. 13 is a flowchart illustrating a method of generating three-dimensional (3D) image data of a graphic processing unit (GPU) illustrated in FIG. 5 according to an exemplary embodiment;

DETAILED DESCRIPTION

Hereinafter, exemplary embodiments will be described in detail with reference to the accompanying drawings.

Figure 1:
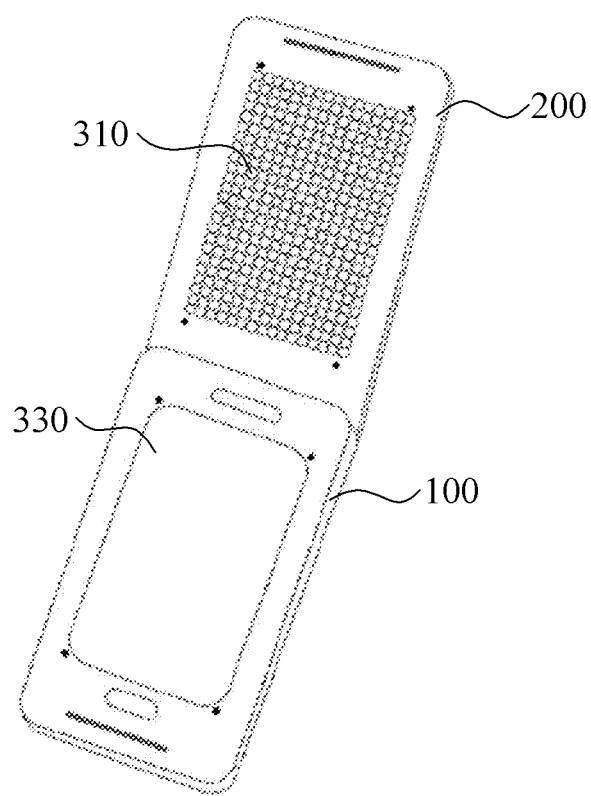
FIG. 1 is a diagram illustrating an electronic device according to an exemplary embodiment.
Figure 2:
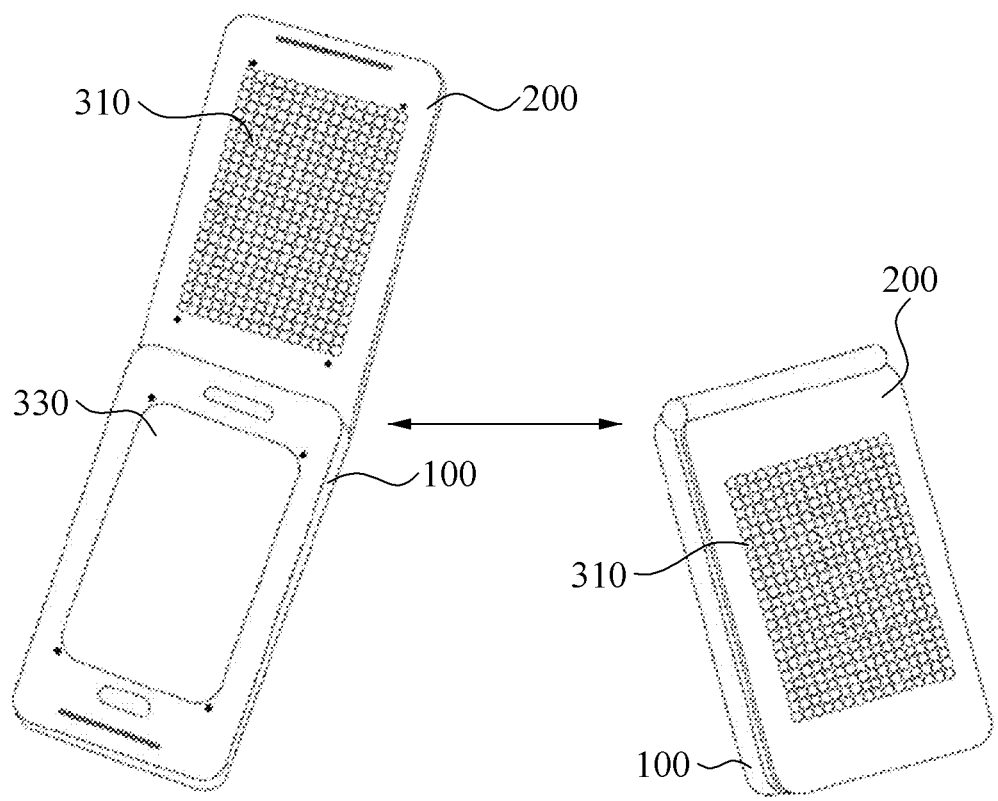
FIG. 2 is a diagram illustrating an exemplary range of movement of a cover illustrated in FIG. 1.

FIG. 1 is a diagram illustrating an electronic device according to an exemplary embodiment, and FIG. 2 is a diagram illustrating an exemplary range of movement of a cover illustrated in FIG. 1 according to an exemplary embodiment.

Referring to FIGS. 1 and 2, an electronic device 10 includes a main body 100 and a cover 200.

The electronic device 10 may be a personal computer (PC), a data server, or a portable device.

A portable device may be a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or a portable navigation device (PND), a portable game console, or an e-book.

Hereinafter, for ease and convenience of description, the electronic device 10 is considered to be a mobile phone as illustrated in FIG. 1.

The cover 200 is connected to the main body 100. In an example, the cover 200 may be an integral type which is combined with the main body 100. In another example, the cover 200 may be a removable type which is detachable from the main body 100.

The cover 200 may be operated (and moved) with respect to the main body 100 by the exertion of a physical force from an outside source. In an example, the cover 200 may overlap a portion of the main body 100. In another example, the cover 200 may overlap an entirety of the main body 100. As illustrated in FIG. 2, the cover 200 may be moveable such that it may be made to move into a position in which it overlaps the entirety of the main body 100 by exertion of the physical force.

Although FIG. 1 illustrates that the cover 200 is a flip close type, the cover 200 is not limited to the flip close type. The cover 200 may be any of various types. For example, the cover 200 may be a flip over type, a slide type, or a rotation type.

The cover 200 includes some electronic elements of the electronic device 10, and the electronic elements included in the cover 200 may be electrically connected to electronic elements included in the main body 100.

Materials comprising the cover 200 may be transparent, translucent, or opaque.

Figure 3:
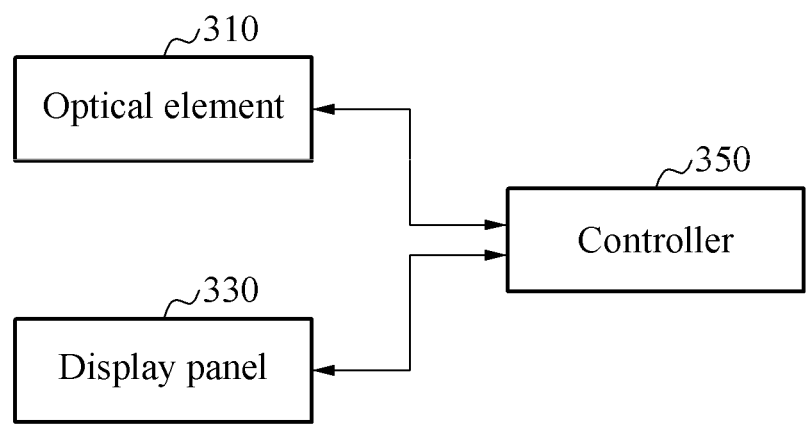
FIG. 3 is a block diagram of the electronic device illustrated in FIG. 1 according to an exemplary embodiment.

FIG. 3 is a block diagram of the electronic device illustrated in FIG. 1 according to an exemplary embodiment.

Referring to FIGS. 1 through 3, the electronic device 10 includes an optical element 310, a display panel 330, and a controller 350.

The optical element 310 may be included in the cover 200. Likewise, the display panel 330 may be included in the cover 200. The optical element 310 outputs a three-dimensional (3D) image by refracting rays emitted from the display panel 330 as a 2D image.

The optical element 310 may be at least one of a parallax barrier and a lens array.

Figure 4A:
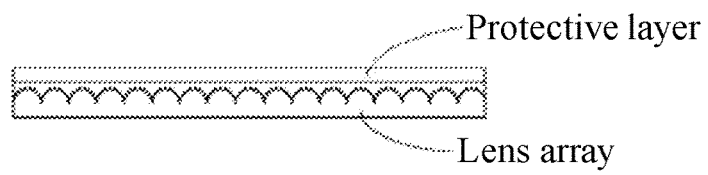
FIGS. 4A and 4B are diagrams illustrating methods of disposing a lens array when an optical element illustrated in FIG. 3 is implemented as a lens array according to exemplary embodiments.
Figure 4B:
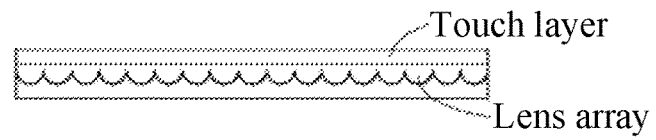

FIGS. 4A and 4B are diagrams illustrating methods of disposing a lens array when an optical element illustrated in FIG. 3 is implemented as a lens array, according to exemplary embodiments.

As illustrated in FIG. 4A, when the optical element 310 is a lens array, the lens array may be disposed such that the lenses thereof face upward, away from the display panel. In this example, a protective layer may be disposed on the lens array to protect the lens array from being damaged. For example, materials of the protective layer may be transparent, and the protective layer may be a touch layer including a touch sensor.

As illustrated in FIG. 4B, when the optical element 310 is a lens array, the lens array may alternatively be disposed such that the lenses thereof face downward, toward the display panel. In this example, the touch layer may be disposed on an upper portion of the lens array, and the protective layer may be also disposed on the upper portion of the lens array.

The lens array may be a microlens array, a microprism array, or a lenticular lens array.

When the optical element 310 is a lens array, for example, a microlens array, the optical element 310 concurrently provides parallax images in a horizontal direction and a vertical direction, and provides a plurality of visual images. Thus, the optical element 310 displays a real and natural 3D image. Even when the display panel 330 of the electronic device 10 is rotated, the optical element 310 concurrently provides different visual images in the horizontal direction and the vertical direction through the use of the microlens array. Thus, a user of the electronic device 10 views a 3D image even when the display panel 330 of the electronic device 10 is rotated.

Materials of the optical element 310 may be transparent.

Hereinafter, for ease and convenience of descriptions, the optical element 310 is assumed to be a lens array 310.

The display panel 330 may be a liquid crystal display (LCD) panel. Also, the display panel 330 may be a touch screen panel, a thin-film-transistor liquid crystal display (FTF-LCD) panel, a liquid emitting diode (LED) display panel, an organic LED (OLED), an active-matrix OLED (AMOLED) display panel, or a flexible display panel. For example, the display panel 330 may be included in the main body 100.

The lens array 310 and the display panel 330 perform one of a 2D display operation or a 3D display operation in response to being controlled by the controller 350.

The controller 350 senses a position state of the lens array 310 for the display panel 330, and generates a 3D image via the display panel 330 and the lens array 310 or generates a 2D image via the display panel 330 based on the sensed position state.

Figure 5:
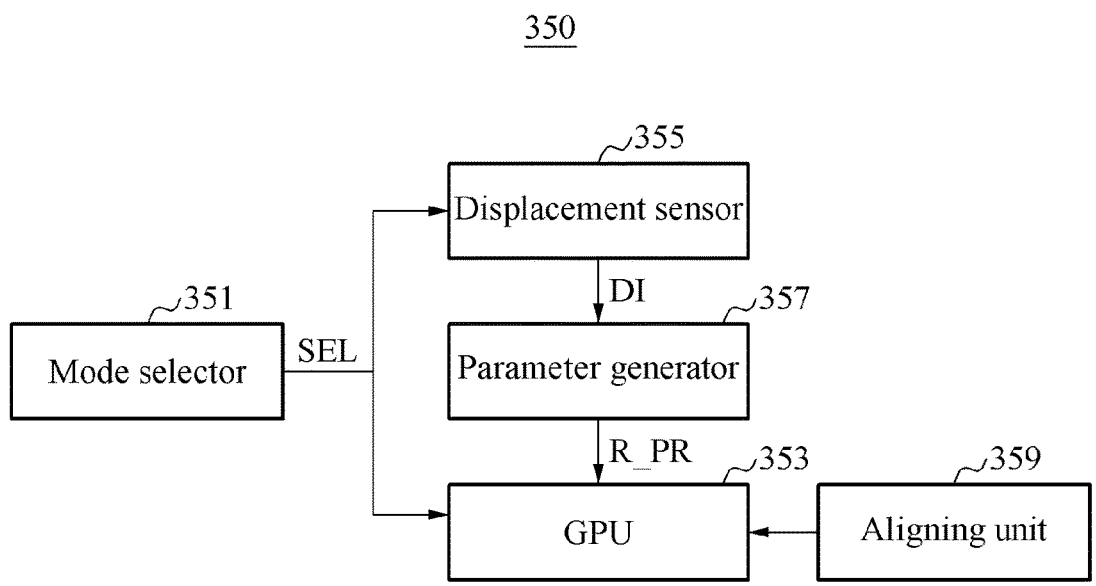
FIG. 5 is a block diagram illustrating a controller illustrated in FIG. 3 according to an exemplary embodiment.

FIG. 5 is a block diagram illustrating a controller illustrated in FIG. 3 according to an exemplary embodiment.

Referring to FIGS. 1 through 5, the controller 350 includes a mode selector 351, a graphic processing unit (GPU) 353, a displacement sensor 355, a parameter generator 357, and an aligning unit 359.

The mode selector 351 generates a mode selection signal (SEL) for selecting a display operation of the lens array 310 and the display panel 330 based on the position state of the lens array 310 and a position state of the display panel 330. The mode selector 351 generates an SEL having a first level, for example, a low level or logic 0, such that the display panel 330 performs the 2D display operation. Alternatively, the mode selector 351 generates an SEL having a second level, for example, a high level or logic 1, such that the lens array 310 and the display panel 330 perform the 3D display operation.

Thus, the electronic device 10 switches between the 2D display operation and the 3D display operation, and displays a 2D image or a 3D image.

Figure 6:
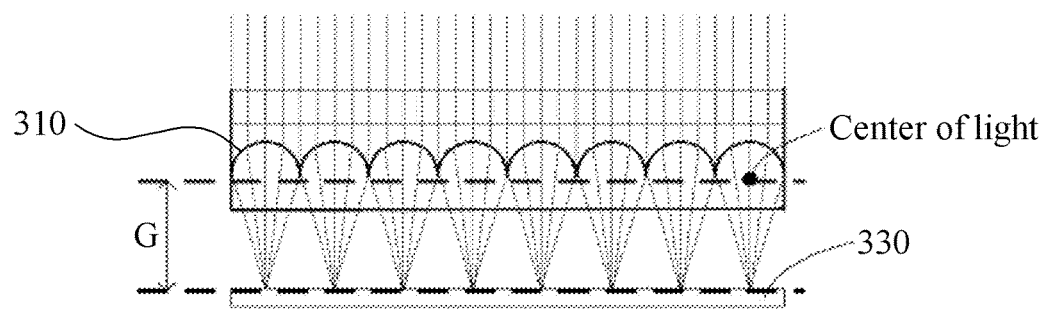
FIG. 6 is a diagram illustrating a positional relationship between a lens array and a display panel illustrated in FIG. 3 when the display panel performs as a three-dimensional (3D) display according to an exemplary embodiment.

FIG. 6 is a diagram illustrating a positional relationship of a lens array and a display panel illustrated in FIG. 3 when the display panel performs 3D display operation, according to an exemplary embodiment.

As illustrated in FIG. 6, when the display panel 330 performs the 3D display operation, a gap G between a preset plane of the lens array 310 and a panel of the display panel 330 corresponds to a focal distance of the lens array 310. In a state in which the cover 200 overlaps the main body 100, the gap G between the lens array 310 included in the cover 200 and the display panel 330 included in the main body 100 corresponds to the focal distance of the lens array 310.

For example, in a state in which the lens array 310 overlaps the display panel 330, the mode selector 351 generates an SEL such that the lens array 310 and the display panel 330 perform the 3D display operation. The state in which the cover 200 overlaps the main body 100 is referred to as a state in which the cover 200 is disposed above the main body 100 and an overlapping area of the cover 200 and the main body 100 is greater than or equal to a preset area. The preset area may be a maximum area in which the cover 200 overlaps the main body 100. In an example, in an electronic device 10 which is a flip close type, a state in which the cover 200 overlaps the electronic device 10 may be a state in which the cover 200 and the main body 100 entirely overlap with each other, for example, a state in which the cover 200 is entirely touching the main body 100. In another example, in an electronic device 10 which is a slide type, a state in which the cover 200 overlaps the electronic device 10 may be a state in which the cover 200 slides inwardly (or downwardly) and then reaches a stopping point at an opposite side (or a stopping point at a bottom side). In addition, the preset area may be set to be 90% of the maximum area in which the cover 200 and the main body 100 entirely overlap each other. The preset area corresponding to 90% of the maximum area is only an example and embodiments described herein are not limited thereto.

In another example, in a state other than a state in which the lens array 310 overlaps the display panel 330, the mode selector 351 generates the SEL such that the display panel 330 performs the 2D display operation. The state may be a state in which the lens array 310 is detached from or spaced from the display panel 330.

The mode selector 351 outputs the SEL to the GPU 353 and/or the displacement sensor 355.

Figure 7:
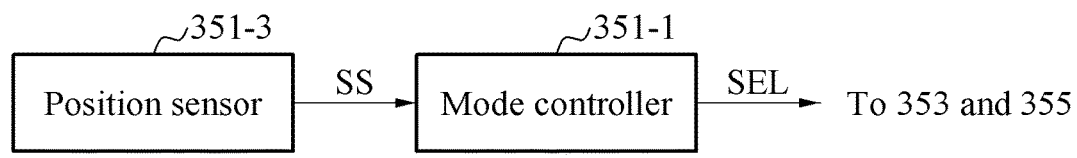
FIG. 7 is a block diagram illustrating an example of a mode selector illustrated in FIG. 5.

FIG. 7 is a block diagram illustrating an example of a mode selector illustrated in FIG. 5.

Referring to FIGS. 1 through 7, a mode selector 351A includes a mode controller 351-1 and a position sensor 351-3. The mode selector 351-1 is an example of the mode selector 351 illustrated in FIG. 5.

The position sensor 351-3 is provided in the main body 100 and/or the cover 200. The position sensor 351-3 senses the position state of the lens array 310 and the position state of the display panel 330, and generates a sensing signal SS, based on a type of the cover 200, when the cover 200 moves with respect to the main body 100. As noted above, the cover may be, for example, a flip close type, a flip over type, a slide type, or a rotation type. The position sensor 351-3 outputs the sensing signal SS to the mode selector 351-1.

The mode selector 351-1 determines the position state of the lens array 310 and the position state of the display panel 330 in response to the sensing signal SS, and generates an SEL based on a result of the determination. For example, the mode selector 351-1 determines an overlapping state of the lens array 310 and the display panel 330, in response to the sensing signal SS.

For example, the mode selector 351-1 generates the SEL such that the lens array 310 and the display panel 330 perform a 3D display operation in a state in which the lens array 310 overlaps the display panel 330.

Furthermore, the mode selector 351-1 may generate the SEL such that the display panel 330 performs a 2D display operation in a state other than the state in which the lens array 310 overlaps the display panel 330.

Figure 8:
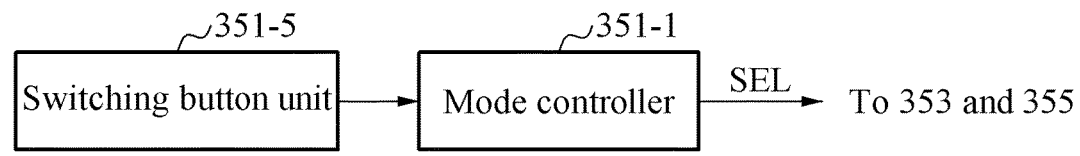
FIG. 8 is a block diagram illustrating another example of the mode selector illustrated in FIG. 5.

FIG. 8 is a block diagram illustrating another example of the mode selector illustrated in FIG. 5.

Referring to FIGS. 1 through 6, and 8, a mode selector 351B includes the mode controller 351-1 and a switching button unit 351-5. The mode selector 351B is another example of the mode selector 351 illustrated in FIG. 5.

The switching button unit 351-5 generates a switching signal in response to a user input.

The mode controller 351-1 generates an SEL in response to the switching signal output from the switching button unit 351-5.

For example, when a level of the switching signal is a first level, for example, a low level or logic 0, the mode controller 351-1 generates the SEL such that the display panel 310 performs a 2D display operation. When the level of the switching signal is a second level, for example, a high level or logic 1, the mode controller 351-1 generates the SEL such that the lens array 310 and the display panel 330 perform a 3D display operation.

According to this exemplary embodiment, a user of the electronic device 10 selects the 2D display operation or the 3D display operation using the switching button unit 351-5.

The mode selector 351B may also include the position sensor 351-3 illustrated in FIG. 7 (not shown in FIG. 8). Here, the user of the electronic device 10 selects an operation state, for example, an ON state or an OFF state, of the position sensor 351-3. When the operation state of the position sensor 351-3 is the ON state, the mode selector 351B automatically controls a display operation mode of the display panel 330 through the position sensor 351-3. When the operation state of the position sensor 351-3 is the OFF state, the mode selector 351B automatically controls the display operation mode through the switching button unit 351-5.

In short, according to the desire of the user, the electronic device 10 performs the 2D display operation and the 3D display operation by performing simple switching.

Figure 9:
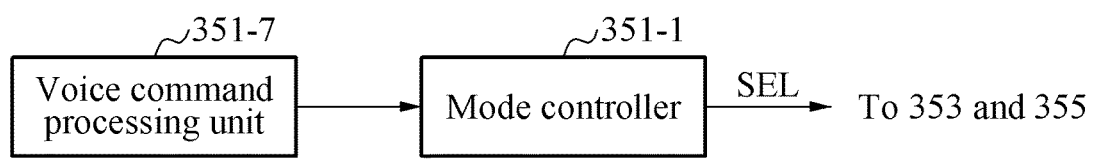
FIG. 9 is a block diagram illustrating still another example of the mode selector illustrated in FIG. 5.

FIG. 9 is a block diagram illustrating still another example of the mode selector illustrated in FIG. 5.

Referring to FIGS. 1 through 6 and 9, a mode selector 351C includes the mode controller 351-1 and a voice command processing unit 351-7. The mode selector 351C is still another example of the mode selector 351 illustrated in FIG. 5.

The voice command processing unit 351-7 recognizes a voice command of a user of the electronic device 10, and generates a switching signal by processing the recognized voice command. The voice command processing unit 351-7 generally performs a voice recognizing operation and a processing operation. The voice command processing unit 351-7 may be an independent circuit connected to a microphone (not shown), or may be integrated with a computing unit (not shown). For example, the computing unit may be a processor, for example, a central processing unit (CPU).

The mode controller 351-1 generates the SEL in response to the switching signal. For example, when a level of the switching signal is a first level, for example, a low level or logic 0, the mode controller 351-1 generates the SEL such that the display panel 330 performs a 2D display operation. When the level of the switching signal is a second level, for example, a high level or logic 1, the mode selector 351C generates the SEL such that the lens array 310 and the display panel 330 perform a 3D display operation.

For example, when the user of the electronic device 10 says "3D display" as an example of the voice command, the mode selector 330-3 generates the SEL such that the display panel 330 performs the 3D display operation in a state in which the cover 200 overlaps the main body 100.

The mode selector 351C may further include the position sensor 351-3 illustrated in FIG. 7 (not shown in FIG. 9). Here, the user of the electronic device 10 may select an operation state, for example, an ON state and an OFF state, of the position sensor 351-3. When the operation state of the position sensor 351-3 is the ON state, the mode selector 351C automatically controls a display operation mode through the position sensor 351-3. When the operation state of the position sensor 351-3 is the OFF state, the mode selector 351C automatically controls the display operation mode through the voice command processing unit 351-7.

In short, according to the desire of the user, the electronic device 10 performs the 2D display operation and the 3D display operation by performing simple switching.

When the electronic device 10 is a portable device, the user may use the 2D display operation to access the basic functions of a mobile terminal such as to enable message editing and calendar viewing, and may use the 3D display mode of operation to access an additional function of a mobile terminal such as to enable video watching and/or game playing.

Referring to FIGS. 1 through 9, the displacement sensor 355 operates in response to the SEL. For example, when a level of the SEL is a second level, an operation of the displacement sensor 355 may start.

Figure 10:
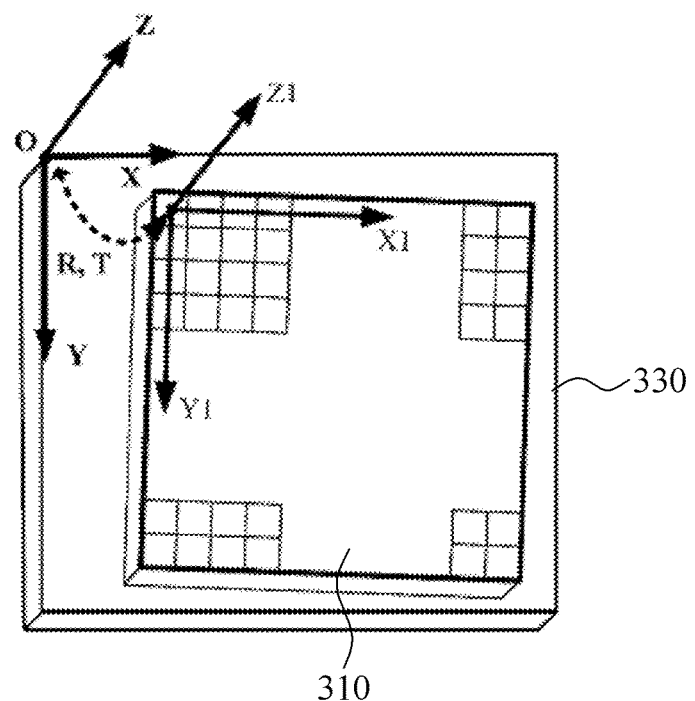
FIG. 10 is a diagram illustrating an example of displacement information generated by a displacement sensor illustrated in FIG. 5.

The displacement sensor 355 measures a displacement DI of the display panel 330 of the lens array 310, and outputs the measured displacement DI to the parameter generator 357. As illustrated in FIG. 10, the measured displacement DI may include a translation parameter T and a rotation parameter R for the display panel 330 of the lens array 310. For example, R is a 3×3 rotation matrix and may indicate a 2×2 translation vector.

The displacement sensor 355 includes at least one displacement sensor. The displacement sensor 355 may include one or more of an inductance type displacement sensor, a capacitance type displacement sensor, an induction sensor, a raster sensor, a magnetostriction displacement sensor, a magnetic grid sensor, a rotation generator, and a photoelectric encoder.

The displacement sensor 355 may be provided in the main body 100 and/or the cover 200. For example, the displacement sensor 355 may include a first displacement sensor and a second displacement sensor. The first displacement sensor may be provided in the main body 100, and the second displacement sensor may be provided in the cover 200.

The aligning unit 359 acquires information on a state of alignment of the lens array 310 and the display panel 330. The aligning unit 359 may include a first aligning unit and a second aligning unit. The first aligning unit may be provided in the main body 100, and the second aligning unit may be provided in the cover 200.

The aligning unit 359 acquires the information on the state of alignment of the lens array 310 and the display panel 330 in a state in which the lens array 310 overlaps the display panel 330.

For example, the aligning unit 359 acquires the information on the state of alignment based on a structure of a textured surface or an embossed surface. The first aligning unit may include an aligning hole structure and/or an aligning groove structure. The second aligning unit may include an aligning protrusion. When the second aligning unit is inserted into the first aligning unit, the aligning unit 359 acquires the information on the state of alignment between the lens array 310 and the display panel 330.

According to another example, the aligning unit 359 acquires the information on the state of alignment between the lens array 310 and the display panel 330 based on force. The first aligning unit and the second aligning unit may be magnetic materials. Alternatively, one of the first aligning unit and the second aligning unit may be a magnetic material, and the other one may be a magnetic metal. When the first aligning unit and the second aligning unit are aligned by a magnetic force, the aligning unit 359 acquires the information on the state of alignment between the lens array 310 and the display panel 330. The first aligning unit and the second aligning unit may be aligned by an electromagnetic force.

The aligning unit 359 outputs the information on the state of alignment to the GPU 353. The aligning unit 359 is not limited to the aforementioned structure.

The parameter generator 357 receives the measured displacement DI. The parameter generator 357 calculates a rendering parameter R_PR for rendering based on a rotation parameter R and a translation parameter T included in the measured displacement DI.

Figure 11:
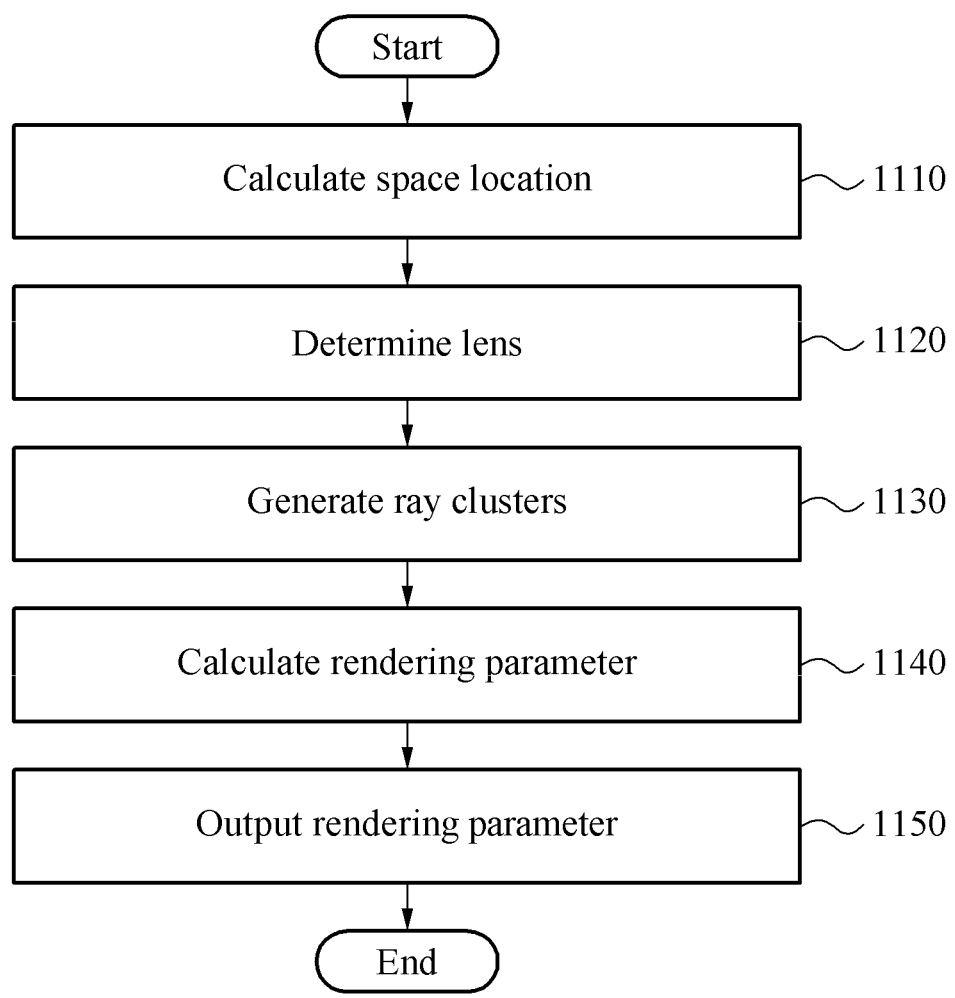
FIG. 11 is a flowchart illustrating an example of a parameter generator illustrated in FIG. 3.
Figure 12A:
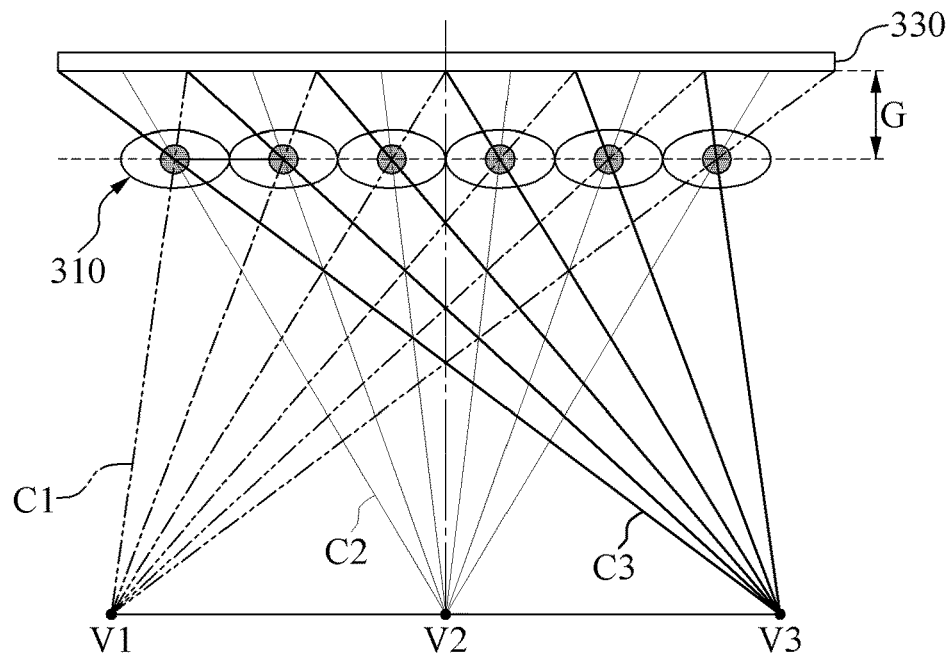
FIGS. 12A and 12B are diagrams illustrating examples of a parameter generator illustrated in FIG. 5.
Figure 12B:
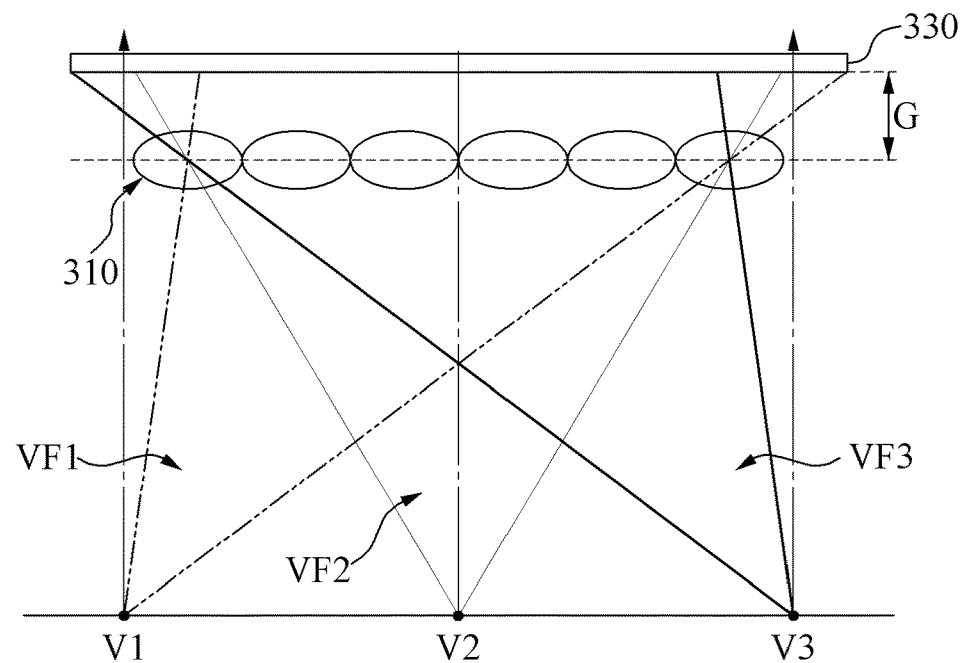

FIG. 11 is a flowchart illustrating an example of a parameter generator illustrated in FIG. 3. FIGS. 12A and 12B are diagrams illustrating examples of a parameter generator illustrated in FIG. 5.

Referring to FIGS. 1 through 12B, in operation 1010, the parameter generator 357 calculates a location on the display panel 330 of each lens included in the lens array 310 based on the rotation parameter R and the translation parameter T.

In operation 1120, the parameter generator 357 determines a lens corresponding to each pixel of an interlaced image based on the calculated space location.

In operation 1130, the parameter generator 370 generates a plurality of ray clusters C1, C2, and C3 by clustering rays of a light field based on the determined lens. The ray clusters C1, C2, and C3 correspond to view frustums VF1, VF2, and VF3, respectively. For ease and convenience of description, FIGS. 12A and 12B illustrate the three ray clusters C1, C2, and C3 according to horizontal directions and the three view frustums VF1, VF2, and VF3 corresponding to the respective ray clusters C1, C2, and C3.

A plurality of rays of the ray cluster C1 corresponds to the view frustum VF1. A plurality of rays of the ray cluster C2 corresponds to the view frustum VF2. A plurality of rays of the ray cluster C3 corresponds to the view frustum VF3.

For example, each of the view frustums VF1, VF2, and VF3 may be a perspective view frustum. Also, each of the view frustums VF1, VF2, and VF3 may be a shear perspective view frustum.

Each of the view frustums VF1, VF2, and VF3 corresponding to the respective ray clusters C1, C2, and C3 may include the rendering parameter R_PR for rendering.

The rendering parameter R_PR may include viewpoints and viewing angles of the view frustums VF1, VF2, and VF3.

In operation 1140, the parameter generator 357 calculates the rendering parameter R_PR for each of the view frustums VF1, VF2, and VF3 corresponding to the ray clusters C1, C2, and C3.

In operation 1150, the parameter generator 357 transmits the rendering parameter R_PR to the GPU 353.

The GPU 353 generates 2D image data or 3D image data in response to an SEL.

When a level of the SEL is a first level, the GPU 353 generates the 2D image data and outputs the generated 2D image data to the display panel 330. Thus, the display panel 330 performs a 2D display operation.

When a level of the SEL is a second level, the GPU 353 generates the 3D image data and outputs the generated 3D image data to the display panel 330. Thus, the lens array 310 and the display panel 330 perform a 3D display operation. For example, the 3D image data may be interlaced 3D image data.

FIG. 13 is a flowchart illustrating a method of generating three-dimensional (3D) image data of a graphic processing unit (GPU) illustrated in FIG. 5 according to an exemplary embodiment.

Referring to FIGS. 1 through 13, the GPU 353 generates 3D image data using the rendering parameter R_PR in response to a determination that the lens array 310 and the display panel 330 are not aligned based on information on the state of alignment output by the aligning unit 359.

In operation 1310, the GPU 353 generates a multi-view image by performing geometry duplication based on the rendering parameter R_PR. For example, the GPU 353 performs the geometry duplication on 3D content of each of the ray clusters C1, C2, and C3, and generates the multi-view image by performing parallel rendering on the view frustums VF1, VF2, and VF3 corresponding to the respective ray clusters C1, C2, and C3. For example, the multi-view image may be generated using a geometry shader of the GPU 353.

In operation 1320, the GPU 353 stores the multi-view image as a single texture image in a memory (not shown). The memory may be a volatile memory or a non-volatile memory.

The volatile memory may be a dynamic random access memory (DRAM), a static random access memory (SRAM), a thyristor RAM (T-RAM), a zero capacitor RAM (Z-RAM), or a twin transistor RAM (TTRAM).

The non-volatile memory may be an electrically erasable programmable read-only memory (EEPROM), a flash memory, a magnetic RAM (MRAM), a spin-transfer torque (STT) MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate memory (NFGM), a holographic memory, a molecular electronics memory device, or an insulator resistance change memory.

In operation 1330, the GPU 353 generates the 3D image data by rearranging pixels of the multi-view image. The rearranging may be performed by a pixel shader or a fragment shader of the GPU 353.

In operation 1340, the GPU 353 outputs the 3D image data to the display panel 330. The GPU 353 may rapidly generate the 3D image data by generating the multi-view image by performing the parallel rendering.

Figure 14:
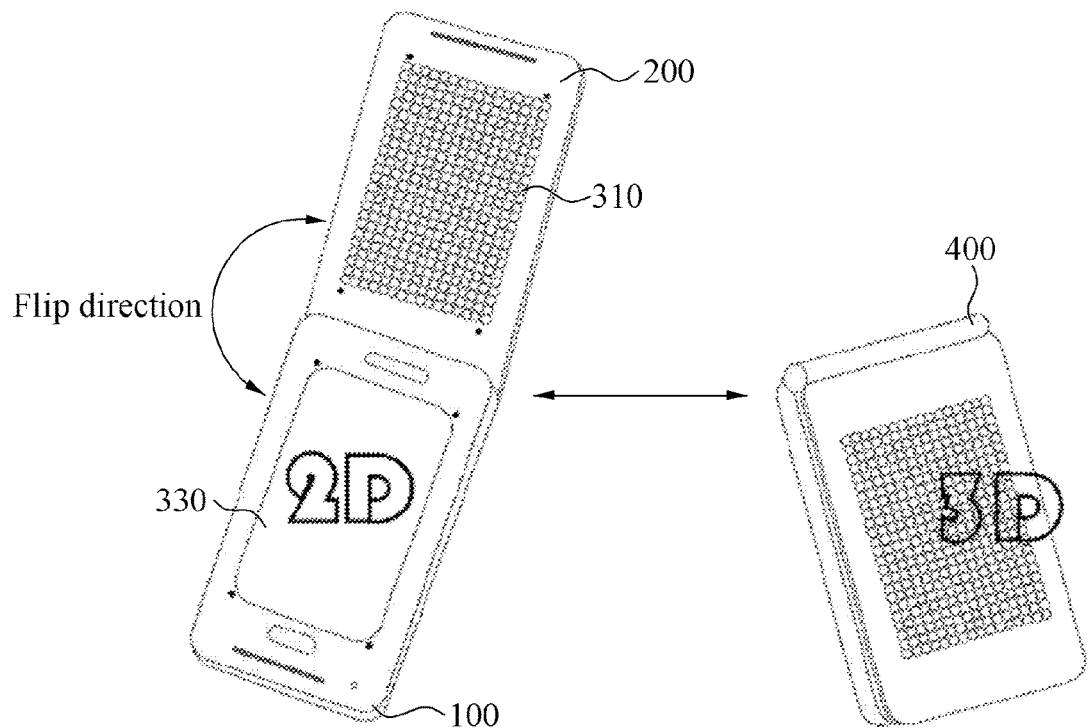
FIG. 14 is a diagram illustrating an operation method of the electronic device illustrated in FIG. 1 according to an exemplary embodiment.

FIG. 14 is a diagram illustrating an operation method of the electronic device illustrated in FIG. 1 according to an exemplary embodiment.

In FIG. 14, the electronic device 10 switches between a 2D display and a 3D display in a flip close type manner. A connector 400 may have a rotation axis along a short edge of the electronic device 10.

Figure 15:
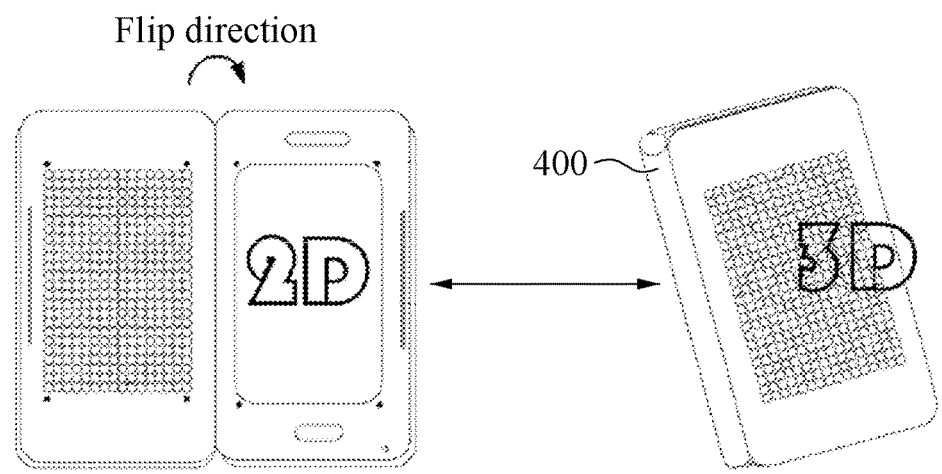
FIG. 15 is a diagram illustrating operation method of the electronic device illustrated in FIG. 1 according to another exemplary embodiment.

FIG. 15 is a diagram illustrating an operation method of the electronic device illustrated in FIG. 1 according to another exemplary embodiment.

In FIG. 15, the electronic device 10 switches between a 2D display and a 3D display in a flip close type manner. The connector 400 may have a rotation axis along a long edge of the electronic device 10.

Figure 16:
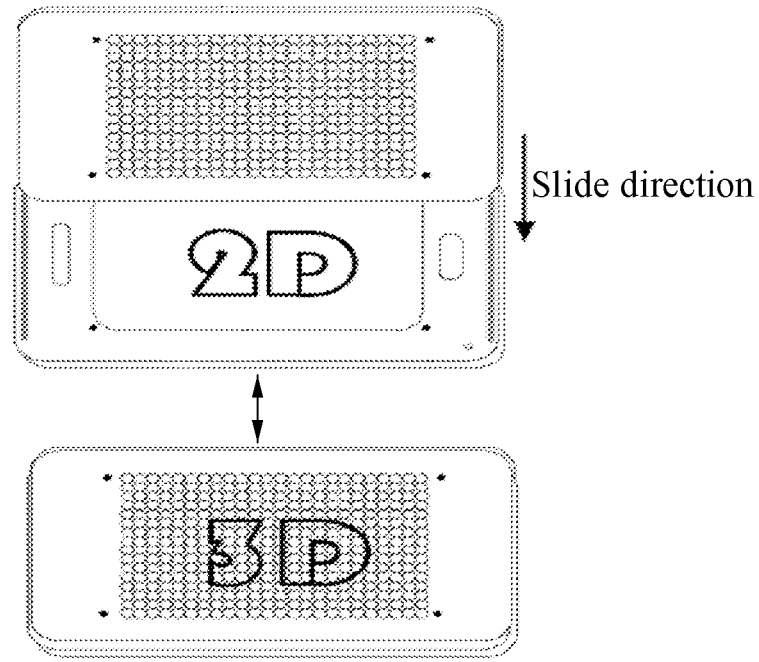
FIG. 16 is a diagram illustrating an operation method of the electronic device illustrated in FIG. 1 according to another exemplary embodiment.

FIG. 16 is a diagram illustrating an operation method of the electronic device illustrated in FIG. 1 according to another exemplary embodiment.

In FIG. 16, the electronic device 10 switches between a 2D display and a 3D display in a slide type manner. A direction of sliding may be perpendicular to a long edge of the electronic device 10.

Figure 17:
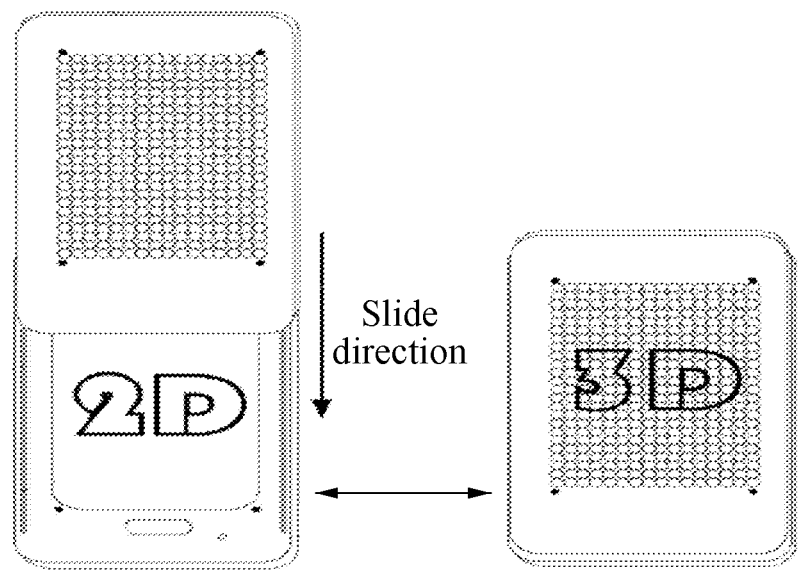
FIG. 17 is a diagram illustrating an operation method of the electronic device illustrated in FIG. 1 according to another exemplary embodiment.

FIG. 17 is a diagram illustrating an operation method of the electronic device illustrated in FIG. 1 according to another exemplary embodiment.

In FIG. 17, the electronic device 10 switches between a 2D display and a 3D display in a slide type manner. A direction of sliding may be perpendicular to a short edge of the electronic device 10.

Figure 18:
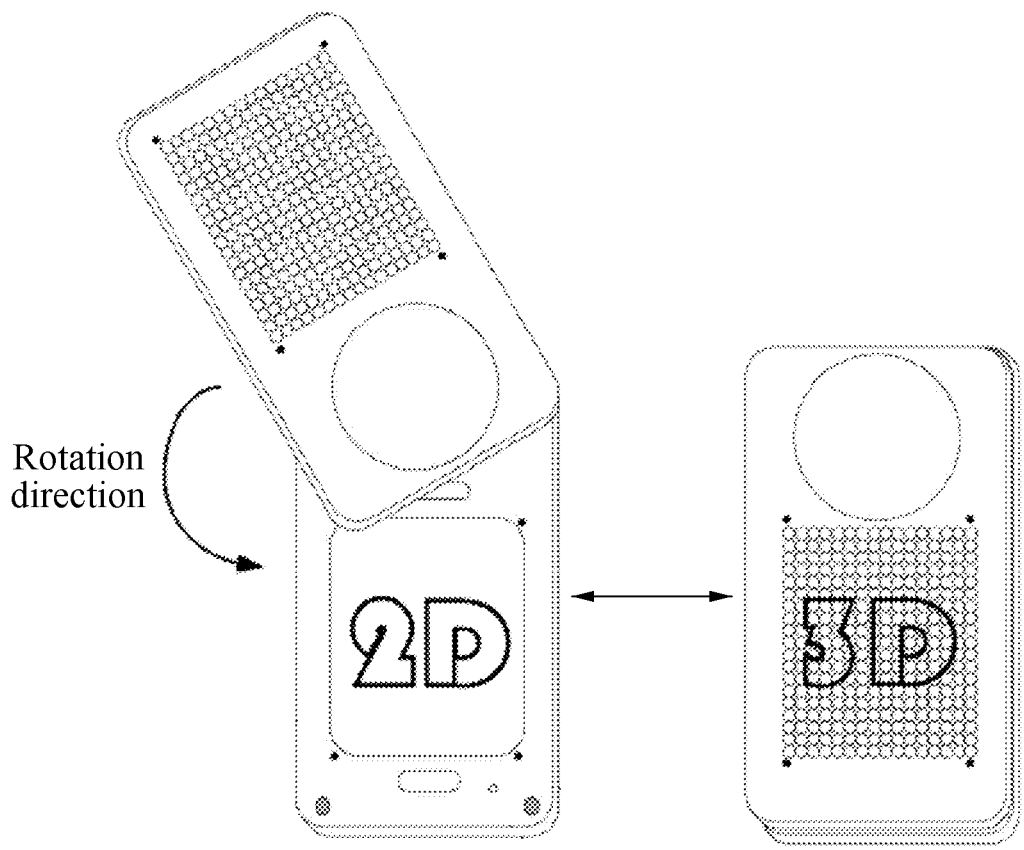
FIG. 18 is a diagram illustrating an operation method of the electronic device illustrated in FIG. 1 according to another exemplary embodiment.

FIG. 18 is a diagram illustrating an operation method of the electronic device illustrated in FIG. 1 according to another exemplary embodiment.

In FIG. 18, the electronic device 10 switches between a 2D display and a 3D display in a rotation type manner. Although FIG. 18 illustrates that a rotation direction of a cover is anticlockwise, the rotation direction is not limited thereto. The rotation direction may be clockwise.

Figure 19:
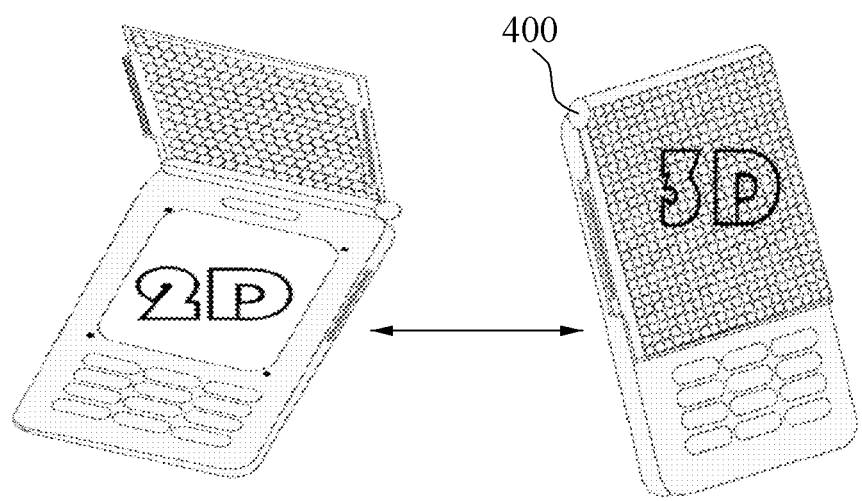
FIG. 19 is a diagram illustrating still another example of an operation method of the electronic device illustrated in FIG. 1.

FIG. 19 is a diagram illustrating an operation method of the electronic device illustrated in FIG. 1 according to another exemplary embodiment.

In FIG. 19, the electronic device 10 switches between a 2D display and a 3D display in a flip close type manner. The cover 200 overlaps a portion of the main body 100 in the closed position.

Figure 20:
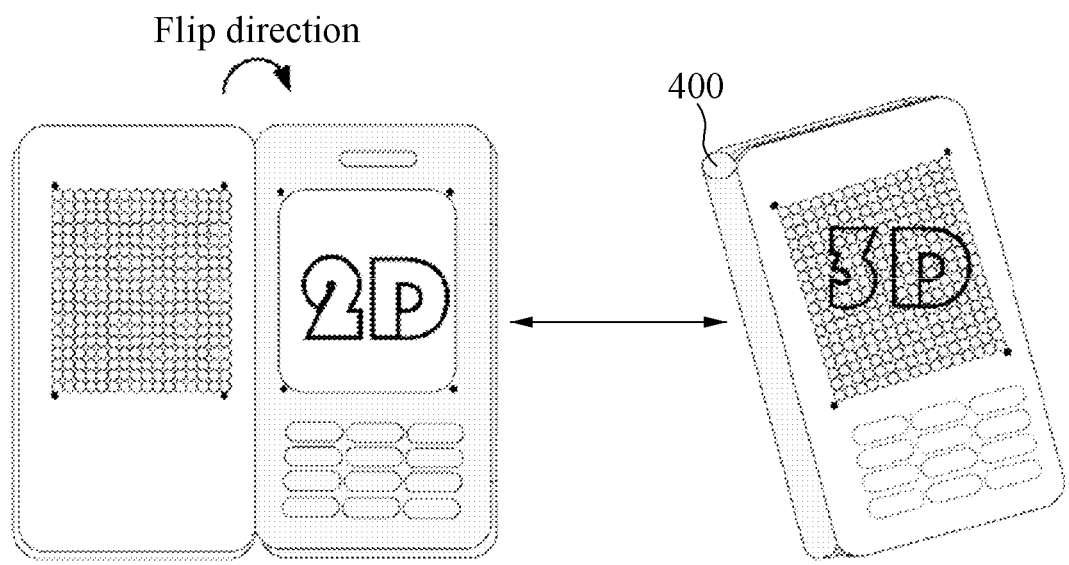
FIG. 20 is a diagram illustrating an operation method of the electronic device illustrated in FIG. 1 according to another exemplary embodiment.

FIG. 20 is a diagram illustrating an operation method of the electronic device illustrated in FIG. 1 according to another exemplary embodiment.

In FIG. 20, the electronic device 10 switches between a 2D display and a 3D display in a flip close type manner. A material of the cover 200 may be transparent or translucent.

Figure 21:
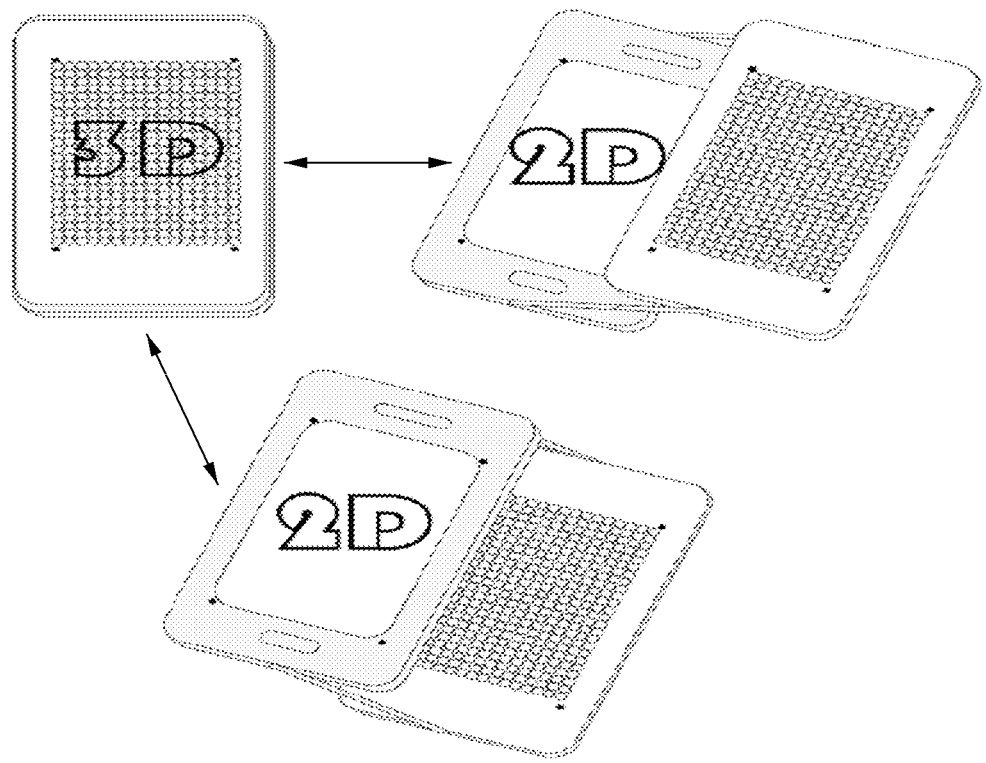
FIG. 21 is a diagram illustrating an operation method of the electronic device illustrated in FIG. 1 according to another exemplary embodiment.

FIG. 21 is a diagram illustrating an operation method of the electronic device illustrated in FIG. 1 according to another exemplary embodiment.

In FIG. 21, the electronic device 10 switches between a 2D display and a 3D display in a flip over type manner. The cover 200 is flipped from a front surface of the display panel 330 to a back surface of the main body 100. When the cover 200 is flipped to a surface of the display panel 330, the electronic device 10 may be in a 3D display operation state. When the cover 200 is flipped and distanced from the surface of the display panel 330, the electronic device 10 may be in a 2D display operation state. In addition, when the cover 200 is flipped and fully folded to the back surface of the main body 100, the electronic device 10 may be in the 2D display operation state.

Exemplary embodiments include computer-readable media including program instructions to enable a computer to implement various operations. The media may also include, alone or in combination with the program instructions, data files, data structures, tables, and the like. The media and program instructions may be those specially designed and constructed for the purposes of exemplary embodiments. Examples of computer-readable media include magnetic media such as hard disks, floppy disks, and magnetic tape; optical media such as CD ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present disclosure is not limited to the described exemplary embodiments. Instead, it would be appreciated by those skilled in the art that changes may be made to these exemplary embodiments without departing from the principles and spirit of the disclosure, the scope of which is defined by the claims and their equivalents.

The invention claimed is:

1. An electronic device comprising:
a display panel;
an optical element; and
a controller configured to:
determine a position of the optical element with respect to the display panel;
control the display panel to generate a three-dimensional (3D) image in a state in which the display panel overlaps the optical element;
control the display panel to generate a two-dimensional (2D) image in a state in which the optical element is spaced from the display panel; and
in the state in which the display panel overlaps the optical element, determine a rendering parameter of the 3D image based on an alignment between the display panel and the optical element.

2. The electronic device of claim 1, wherein the alignment comprises a rotational displacement between the display panel and the optical element and a translation between the display panel and the optical element.

3. The electronic device of claim 1, wherein the controller comprises:
a mode selector configured to generate a mode selection signal based on the determined position;
a displacement sensor configured to measure a displacement of the optical element in response to the mode selection signal;
an aligning unit configured to determine the alignment between the display panel and the optical element
a parameter generator configured to calculate the rendering parameter based on the alignment; and
a graphic processing unit (GPU) configured to generate the 3D image using the rendering parameter.

4. The electronic device of claim 3, wherein the mode selector comprises:
a position sensor configured to sense a position of the display panel and a position of the optical element and generate a sensing signal; and
a mode controller configured to determine the position of the optical element in response to the sensing signal and to generate the mode selection signal based on the determined position.

5. The electronic device of claim 4, wherein the mode selector further comprises a switching button unit configured to generate a switching signal in response to a user input, and wherein the mode controller is configured to generate the mode selection signal in response to the switching signal.

6. The electronic device of claim 4, wherein the mode selector further comprises a voice command processing unit configured to recognize a voice command of a user and generate the switching signal by processing the voice command, and wherein the mode controller is configured to generate the mode selection signal in response to the switching signal.

7. The electronic device of claim 1, wherein the optical element comprises at least one of a microlens array, a microprism array, and a lenticular lens array.

8. The electronic device of claim 1, wherein the electronic device comprises a cover and a main body, and wherein optical element is disposed in the cover and the display panel is disposed in the main body.

9. The electronic device of claim 8, wherein the cover is moveable with respect to the main body.

10. The electronic device of claim 1, wherein the electronic device is portable device.

11. An operation method of an electronic device, the method comprising:
   determining a position of an optical element with respect to a display panel; and
   outputting a three-dimensional (3D) image through the display panel and the optical element based on the determined position indicating that the display panel overlaps the optical element and determining a rendering parameter of the 3D image based on an alignment between the display panel and the optical element;
   outputting a two-dimensional (2D) image through the display panel based on the determined position indicating that the optical element is spaced from the display panel.

12. The method of claim 11, wherein the alignment comprises a rotational displacement between the display panel and the optical element and a translation between the display panel and the optical element.

13. The method of claim 11, wherein the optical element comprises at least one of a microlens array, a microprism array, and a lenticular lens array.

14. The method of claim 11, wherein the electronic device comprises a cover and a main body, and wherein the optical element is disposed in the cover and the display panel is disposed in the main body.

15. The method of claim 14, wherein the cover is moveable with respect to the main body.

* * * * *